United States Patent
Zhang (10) Patent No.: US 12,507,242 B2
(45) Date of Patent: Dec. 23, 2025

(54) INFORMATION TRANSMISSION METHOD AND APPARATUS, RELEVANT DEVICE, AND STORAGE MEDIUM

(71) Applicant: GUANGDONG OPPO MOBILE TELECOMMUNICATIONS CORP., LTD., Dongguan (CN)

(72) Inventor: Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 330 days.

(21) Appl. No.: 17/704,619

(22) Filed: Mar. 25, 2022

(65) Prior Publication Data

US 2022/0217757 A1 Jul. 7, 2022

Related U.S. Application Data (63) Continuation of application No. PCT/CN2019/116864, filed on Nov. 8, 2019.

(51) Int. Cl.
*H04W 72/00* (2023.01)
*H04W 72/23* (2023.01)
*H04W 74/0808* (2024.01)

(52) U.S. Cl.
CPC ....... *H04W 72/23* (2023.01); *H04W 74/0808* (2013.01)

(58) Field of Classification Search
None
See application file for complete search history.

(56) References Cited

U.S. PATENT DOCUMENTS

| | | | | |
|---|---|---|---|---|
| 2020/0092913 A1* | 3/2020 | Xu | ...................... | H04W 72/0446 |
| 2020/0146064 A1* | 5/2020 | Oh | ...................... | H04W 74/0808 |
| 2022/0104199 A1* | 3/2022 | Liu | ...................... | H04W 48/16 |
| 2022/0123872 A1* | 4/2022 | Zhang | ...................... | H04L 1/1861 |

FOREIGN PATENT DOCUMENTS

| | | |
|---|---|---|
| CN | 105578573 A | 5/2016 |
| CN | 107439048 A | 12/2017 |
| CN | 109309961 A | 2/2019 |
| CN | 109417792 A | 3/2019 |
| CN | 109600836 A | 4/2019 |
| CN | 110351874 A | 10/2019 |

(Continued)

OTHER PUBLICATIONS

International Search Report issued in corresponding International Application No. PCT/CN2019/116864, mailed Jul. 29, 2020, 30 pages.

(Continued)

*Primary Examiner* — Brandon M Renner
(74) *Attorney, Agent, or Firm* — BAYES PLLC (57) ABSTRACT

Disclosed in embodiments of the present application are an information transmission method and apparatus, a terminal, a network device, and a storage medium. The method comprises: a terminal receives first information sent by a network device by means of downlink control information (DCI); the terminal determines, by using the first information, a time during which a channel can be occupied from a first moment.

19 Claims, 4 Drawing Sheets

(56) References Cited

FOREIGN PATENT DOCUMENTS

| | | | | |
|---|---|---|---|---|
| CN | 112997562 A | * | 6/2021 | ............ H04W 72/23 |
| WO | 2019192449 A1 | | 10/2019 | |

OTHER PUBLICATIONS

Written Opinion of the International Searching Authority issued in corresponding International Application No. PCT/CN2019/116864, mailed Jul. 29, 2020, 9 pages.

"Discussion on physical DL channel design in unlicensed spectrum", Agenda Item: 7.2.2.3.1, Source: vivo, 3GPP TSG RAN WG1 Meeting #94bis R1-1810380, Chengdu, China, Oct. 8-12, 2018, 4 pages.

"NR Unlicensed Physical Channel Design Considerations", Agenda Item: 7.6.3, Source: Apple Inc., 3GPP TSG RAN WG1 Meeting #92bis R1-1804768, Sanya, China, Apr. 16-20, 2018, 6 pages.

First Office Action issued in corresponding Chinese application No. 202210440764.7, mailed Jun. 2, 2023.

First Office Action issued in corresponding European application No. 19951750.9, mailed Apr. 6, 2023.

ZTE et al., "Considerations on DL reference signals and channels design for NR-U", R1-1909972, 3GPP TSG RAN WG1 Meeting #98bis Chongqing, China, Oct. 14-20, 2019.

Qualcomm Incorporated, "DL signals and channels for NR-U", R1-1904997, 3GPP TSG RAN WG1 Meeting #96b Xi'an, China Apr. 8-Apr. 12, 2019.

Notice of Allowance issued in corresponding Chinese application No. 202210440764.7, mailed Sep. 13, 2023.

Second Office Action issued in corresponding European application No. 19951750.9, mailed Oct. 5, 2023.

First Office Action issued in corresponding Japanese application No. 2022-526256, mailed Oct. 10, 2023.

3GPP TSG RAN WG1 Meeting #98bis Chongqing, CN Oct. 14-Oct. 20, 2019; R1-1911095 Source: Qualcomm Incorporated; Title: DL signals and channels for NR-U.

Extended European Search Report issued in conrresponding European application No. 19951750.9, mailed Jul. 15, 2022.

Huawei et al., "DL channels and signals in NR unlicensed band", R1-1906042, 3GPP TSG RAN WG1 Meeting #97 Reno, USA, May 13-17, 2019.

LG Electronics, "Physical layer design of DL signals and channels for NR-U", R1-1910817, 3GPP TSG RAN WG1 #98bis Chongqing, China, Oct. 14-20, 2019.

Nokia et al., "On DL signals and channels", R1-1910602, 3GPP TSG RAN WG1 Meeting #98bis Chongqing, China, Oct. 14-20, 2019.

* cited by examiner

INFORMATION TRANSMISSION METHOD AND APPARATUS, RELEVANT DEVICE, AND STORAGE MEDIUM

CROSS-REFERENCE TO RELATED APPLICATION

This application is a continuation application of PCT Application No. PCT/CN2019/116864, filed Nov. 8, 2019, the contents of which are incorporated herein by reference in its entirety,

TECHNICAL FIELD

The present application relates to wireless communication technology, in particular, to an information transmission method, apparatus, related devices and storage medium.

BACKGROUND

Unlicensed spectrum is a shared spectrum. The communication devices in different communication systems may use the unlicensed spectrum as long as they meet the regulatory requirements set by countries or regions on the spectrum, and there is no need to apply to the government for exclusive spectrum licensing.

In order to enable various communication systems using the unlicensed spectrum for wireless communication to coexist friendly on the spectrum, some countries or regions have stipulated the regulatory requirements that must be met when using the unlicensed spectrum.

For example, the communication device follows the principle of "listening before talk (LBT)", that is, the communication device needs to listen to the channel before sending the signal on the channel of the unlicensed spectrum. The communication device can send the signal only when the channel listening result is that the channel is idle; and if the channel listening result is that the channel is busy, the communication device cannot send the signal. In order to ensure fairness, in one transmission, the duration of signal transmission by the communication device using the channel of the unlicensed spectrum shall not exceed the maximum channel occupancy time (MCOT). However, it is more important for the terminal to know the time during which the channel can be occupied.

SUMMARY

In order to solve the related technical problems, the embodiments of the present application provide an information transmission method, apparatus, related devices and storage medium.

The embodiments of the present application provide an information transmission method, including:
  receiving, by a terminal, first information sent by a network device through downlink control information (DCI); and
  determining, by the terminal, time of a channel that can be occupied from a first moment by using the first information.

The embodiments of the present application also provide an information transmission method, including:
  sending, by a network device, first information to a terminal through DCI; where the first information is used for the terminal to determine time of a channel that can be occupied from a first moment.

The embodiments of the present application also provide an information transmission apparatus arranged on a terminal, including:
  a receiving unit, configured to receive first information sent by a network device through DCI; and
  a determining unit, configured to determine time of a channel that can be occupied from first moment by using the first information.

The embodiments of the present application also provide an information transmission apparatus arranged on a network device, including:
  a sending unit, configured to send first information to a terminal through DCI; where the first information is used for the terminal to determine time of a channel that can be occupied from a first moment.

The embodiments of the present application also provide a terminal, including a first processor and a first memory for storing a computer program that can run on the processor,
  where the first processor is configured to execute the steps of the method on the terminal side when running the computer program.

The embodiments of the present application also provide a network device, including a second processor and a second memory for storing a computer program that can run on the processor,
  where the second processor is configured to execute the steps of the method on the network device side when running the computer program.

The embodiments of the present application also provide a storage medium on which a computer program is stored. When the computer program is executed by a processor, the steps of the method on the terminal side or the steps of the method on the network device side are implemented.

In the information transmission method, apparatus, related devices and storage medium provided by the embodiments of the present application, the network device sends the first information to the terminal through DCI; the terminal receives the first information sent by the network device through DCI, and determines the time of the channel that can be occupied from the first moment by using the first information; and the bit information in the DCI indicates to the terminal the channel time that can be occupied. In this way, the indication of channel occupancy time (COT) information is realized.

DETAILED DESCRIPTION

The present application will be further described in detail below in conjunction with the drawings and the embodiments.

It should be noted that in the present disclosure, "first", "second", etc. are used to distinguish similar objects, and not necessarily used to describe a specific sequence or order.

In addition, the technical solutions described in the embodiments of the present application may be combined arbitrarily if there is no conflict.

For the terminal, knowing the channel time that can be occupied can bring many convenient conditions to the terminal.

For example, after knowing the downlink channel time that can be occupied, the terminal can accurately know the time when the downlink data transmission ends, and then LBT can be performed as soon as possible. After knowing the uplink channel time that can be occupied, the terminal can reasonably arrange the uplink transmission, etc.

Based on this, in various embodiments of the present application, the bit information in the DCI (such as DCI2_0 format) is used to indicate the channel time that can be occupied.

Figure 1:
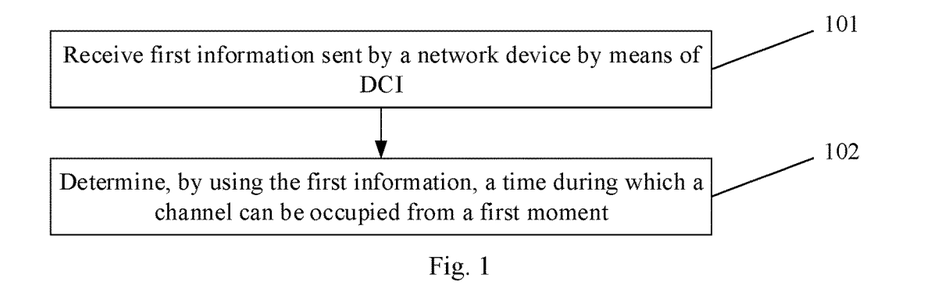
FIG. 1 is a schematic flow diagram of an information transmission method at a terminal side according to the embodiment of the present application.

The embodiments of the present application provide an information transmission method. As shown in FIG. 1, the method includes the following steps.

In step 101, the terminal receives first information sent by the network device through DCI.

Here, the format of the DCI is DCI2_0.

In other words, the first information is sent in the DCI2_0 format.

In step 102, the terminal determines time of a channel that can be occupied from a first moment by using the first information.

Here, the first moment includes a moment related to the terminal receiving the DCI, that is, the first moment includes a moment related to a moment when the terminal receives the DCI.

The first information is used for the terminal to learn the channel time that can be occupied, and if the reference of the channel time that can be occupied is different, the learned channel time that can be occupied is different. In practical applications, the first moment may include the moment when the terminal receives the first information, may also include a moment of a first symbol of the received DCI, may be a moment of the last symbol of the received DCI, may also include a moment of a symbol advanced by X symbols from the first symbol of the received DCI, and X is an integer greater than or equal to 1.

In practical applications, in a frame-based equipment (FBE) system, that is, the type of the network device is FBE, if DCI2_0 does not appear in every fixed frame period (FFP), for example, DCI2_0 appears once every two FFPs, DCI2_0 also needs to act in the next FFP, that is, the DCI is associated with P FFPs. More specifically, the bit information corresponding to the first information needs to act in P FFPs, that is, the bit information is associated with P FFPs. When P is 1, the first moment includes the moment related to the moment when the terminal receives the DCI; and when P is greater than 1, the first moment may include a start moment of the $Q^{th}$ FFP after FFP where the DCI is located; where Q is an integer greater than or equal to 1, and Q is less than P.

In practical applications, the number of bits of bit information corresponding to the first information may be configured by the network device (such as a base station).

Based on this, in an embodiment, the method may further include:

determining, by the terminal, the number of bits of bit information corresponding to the first information by means of RRC configuration.

In practical applications, the number of bits of bit information corresponding to the first information may also be fixed.

The bit information corresponding to the first information may be associated with a plurality of cells.

For example, assuming that the bit information corresponding to the first information contains 6 bits, starting from the most significant bit, the first 2 bits of the most significant bit indicate the channel occupancy time information associated with one cell, the middle 2 bits indicate the channel occupancy time information associated with one cell, and the last 2 bits indicate the channel occupancy time information associated with one cell.

Based on this, in an embodiment, the characteristics of the bit information corresponding to the first information satisfy that:

the bit information includes channel occupancy time information associated with M cells; M is greater than or equal to 1.

That is, M is a positive integer; and the bit information is related to a cell index.

Here, in the FBE system, when the bit information is associated with P FFPs, the channel occupancy time information associated with each cell is associated with P FFP periods.

In other words, the channel occupancy time information associated with one cell includes the channel occupancy time information in each FFP of one cell.

In practical applications, when the channel occupancy time information associated with a plurality of cells is included, the terminal needs to learn the channel occupancy time information associated with the cell which the terminal accesses according to the bit information, and at this time, it may indicate a start bit of the channel occupancy time information associated with each cell in the bit information.

Based on this, in an embodiment, the method may further include:

obtaining, by the terminal, second information by means of RRC configuration;

The terminal uses the second information to determine the bit location of the channel occupancy time information associated with each cell in M in the bit information.

Specifically, the terminal may use the second information to determine the start bit of the channel occupancy time associated with each cell in the bit information.

Here, in actual applications, the start bit of the channel occupancy information associated with each cell in the bit information is indicated based on a cell identifier (such as a cell index), that is, the second information contains the index of each cell and the corresponding start bit.

For example, assuming that DCI2_0 has a total of 10 bits, the network device may notify the user equipment (UE) that the channel occupancy information associated with cell 1 starts from the first bit, and a total of 3 bits need to be read. The channel occupancy information associated with cell 2 starts from the fourth bit, and a total of 3 bits need to be read, and so on. The UE knows the identifier of the cell to which it is connected after entering the connected state, and if UE1 is connected to cell 1, it may start reading from the first bit, and after reading 3 bits, the channel occupancy information associated with cell 1 is obtained. When UE2 is connected to cell 1 and cell 2, UE2 starts to read from the first bit, and after reading 3 bits, the channel occupancy information associated with cell 1 is obtained, and then UE 2 reads from the fourth bit of DCI2_0, and after reading 3 bits, the channel occupancy information associated with cell 2 is obtained.

That is, the second information explicitly indicates the start bit of the channel occupancy time information associated with each cell in the bit information.

In practical applications, the second information may also implicitly indicate the start bit of the channel occupancy time information associated with each cell in the bit information, for example, indicating an offset relative to one parameter (such as a slot format indicator (SFI)) of one cell, and the terminal determines the start bit of the channel occupancy time information in the bit information according to the start bit of this parameter and the corresponding offset.

For example, in DCI2_0, there are both the SFI information of the cell and the channel occupancy time information associated with the cell. The network device may indicate in the RRC configuration which position the bit starting location of the SFI information of cell 1 is in DCI2_0, and then the channel occupancy time information bit location associated with cell 1 may be obtained by adding one offset to the bit starting location of the SFI of cell 1. The offset may be explicitly indicated to the terminal, or it may be fixed, and the terminal may also determine the offset through other information, for example, the total number of bits of the SFI, the total number of cells, and the number of bits of the channel occupancy time information associated with each cell are used to determine the offset.

The bit information corresponding to the first information may include channel occupancy time information on one or more subbands in one cell.

Based on this, in an embodiment, the bit information includes channel occupancy time information of N subbands; N is greater than or equal to 1; and the N subbands correspond to one cell.

That is, N is a positive integer.

Here, in the FBE system, when the bit information is associated with P FFPs, the channel occupancy information associated with one cell is associated with P FFPs; and the channel occupancy time of N subbands is associated with each FFP in P FFPs.

In other words, the channel occupancy information associated with one cell includes the time occupancy information of each subband in each FFP of one cell.

In practical applications, in the FBE system, the terminal determines the FFP period and the DCI2_0 period according to the configuration of the base station. When DCI2_0 is not configured in each FFP period, DCI2_0 may be associated with P FFP periods.

For example, the base station informs the terminal in the RRC of the starting location of the channel occupancy time information corresponding to each cell, and the total number of bits (for example, 12 bits) of the channel occupancy time information corresponding to each cell, then, assuming that P is 2, the 12 bits may be divided into the first FFPs (6 bits) and the second FFPs (6 bits); and assuming that N is equal to 3, then the 6 bits of each FFP may be further divided into subband 1 (2 bits), subband 2 (2 bits), and subband 3 (2 bits).

Among them, the first FFP is the FFP where the DCI2_0 received by the terminal is located, and the second FFP refers to the next FFP of the first FFP.

At this time, for the terminal, when DCI2_0 is not configured in one FFP (for example, the second FFP in the above example), but the channel time occupancy information in this FFP has been indicated (for example, in the above example, the channel time occupancy information of the second FFP is indicated by DCI2_0 in the first FFP), the terminal needs to determine the validity of the channel time occupancy information in the second FFP. The criterion for judging validity may be: if the terminal receives any downlink channel or signal sent from the base station within this FFP, it is determined that the channel time occupancy information is valid; otherwise, it is determined that the channel time occupancy information is invalid.

The subband refers to the subband corresponding to the unlicensed spectrum, and may be referred to as an LBT subband.

In practical applications, the value of N, that is, the number of subbands, may be configured by the network device.

Based on this, in an embodiment, the method may further include:

obtaining, by the terminal, the value of N by means of RRC configuration.

In addition, for each cell, the value of N may be the same or different.

When the bit information includes channel occupancy time information of a plurality of subbands, the terminal also needs to know the channel occupancy time information of each subband.

Specifically, the terminal may obtain the channel occupancy time information of each subband in the following manners.

In the first manner, the terminal obtains the number of bits of the channel occupancy time information of each subband by means of RRC configuration.

In the second manner, the terminal obtains the total number of bits of the channel occupancy information of N subbands by means of RRC configuration; and determines the number of bits of the channel occupancy time information of each subband based on the total number of bits obtained; where the number of bits of the channel occupancy time information of each band is the same.

In the third manner, the terminal obtains the number of bits of the channel occupancy time information of a first subband among the N subbands by means of RRC configuration; and determines the number of bits of the channel occupancy time information of other subband(s) in the N subbands except the first subband based on the obtained number of bits of the channel occupancy time information of the subband; where the number of bits of the channel occupancy time information of each subband is the same.

In the fourth manner, the number of bits of the channel occupancy time information of each subband is fixed.

In practical applications, the first subband may be any one of the N subbands.

One of the above manners may be selected as required to obtain the channel occupancy time information of each subband.

In practical applications, when the channel occupancy time information on a plurality of subbands is included, the terminal needs to know the channel occupancy time information on the subband where it is located based on the bit information, and at this time, it may indicate the start bit of the channel occupancy time information on each subband in the bit information.

Based on this, in an embodiment, the method may further include:

the terminal obtaining fourth information by means of RRC configuration; and the terminal determining the bit location of the channel occupancy time information of each of the N subbands in the bit information by using the fourth information.

Specifically, the terminal may use the fourth information to determine the start bit of the channel occupancy time of each subband in the bit information.

Here, in actual applications, the start bit of the channel occupancy information on each subband in the bit information is indicated based on a subband identifier (such as a subband index), that is, the second information contains each subband identifier and the corresponding start bit.

In practical applications, the number of bits corresponding to the channel occupancy time information of each subband is fixed or configurable.

Whether the number of bits corresponding to the channel occupancy time information on each subband is fixed or configurable is associated with the type of the network device. Specifically, whether the number of bits corresponding to the channel occupancy time information on each subband is fixed or configurable depends on whether the type of network device is FBE or LBE.

Specifically, when the type of the network device includes FBE, the number of bits corresponding to the channel occupancy time information of each subband is fixed; and when the type of the network device includes LBE, the number of bits corresponding to the channel occupancy time information of each subband is configurable.

Assuming that the number of bits corresponding to the channel occupancy time information of each subband is L, when different granularities are used to represent the channel occupancy time information of the subbands, L has different meanings.

Specifically, when the number of symbols is used to represent the channel occupancy time information of the subband, L represents the number of symbols that can occupy the channel; and when the number of symbols and slots are used to represent the channel occupancy time information of the subband, L represents the number of slots that can occupy the channel and the number of symbols outside the slots that can occupy the channel; and when slots are used to represent the channel occupancy time information of the subband, L represents the number of slots that can occupy the channel.

Here, in actual applications, the channel may be a downlink channel, an uplink channel, or a flexible channel. The symbol may be an Orthogonal Frequency Division Multiplexing (OFDM) symbol.

When L represents the number of slots that can occupy the channel and the number of symbols outside the slots that can occupy the channel, L includes a first part and a second part; the first part represents the number of slots that can occupy the channel; and the second part represents the number of symbols outside the slots that can occupy the channel.

In other words, L bits are divided into two parts, the first part has L-A bits, and the second part has A bits.

In practical applications, when the symbol is an OFDM symbol, A=ceil(log 2(14)), which is used to represent 1-14 OFDM symbols. Among them, the function of the ceil( ) function is to return the smallest integer greater than or equal to a specified expression.

In practical applications, the value of L is related to MCOT and the content represented by L.

MCOT is related to the type of network device; where the type is FBE or LBE.

In practical applications, in the N subbands, there may be a condition in which some subbands cannot be used, that is, the subbands are invalid. Therefore, the terminal needs to know which subbands are invalid.

Based on this, in an embodiment, the method may further include:

receiving fifth information sent by the network device through the DCI; and determining whether individual subbands in the N subbands are valid using the fifth information.

In practical applications, a new field may be added to the DCI for setting the fifth information, or a reserved field in the DCI may be used to set the fifth information. The number of bits of the fifth information may be set as required. Assuming that the value of N is 4, then 4 bits may be set to indicate each subband, and each bit indicates whether one subband is valid. Exemplarily, it is possible to sequentially indicate whether the subbands with indexes of 0, 1, 2, and 3 are valid in an order of the subband index starting from the highest bit in the 4 bits. It is also possible to sequentially indicate whether the subbands with indexes 0, 1, 2, and 3 are valid in an order of the subband index starting from the lowest bit in the 4 bits. When the bit is set to 1, it means that the corresponding subband is valid, and when it is set to 0, it means that the corresponding subband is valid. Other setting methods are also possible.

When it is determined that a certain subband is invalid, the terminal may ignore the channel occupancy time information corresponding to this subband. The channel occupancy time information of the invalid subband is still included in the first information.

In practical applications, the DCI may also carry other information. In this case, the terminal also needs to know the location of the first information in the DCI.

Based on this, in an embodiment, the method may further include:

the terminal obtaining a start bit of the first information in the DCI by means of RRC configuration.

In practical applications, in order to facilitate the terminal to learn whether the first information is carried in the DCI, indication information may be set.

Based on this, in an embodiment, the method may further include:

the terminal obtaining third information by means of RRC configuration; and the terminal determining whether the first information exists in the DCI using the third information.

Here, in actual applications, 1 bit may be set. When this bit is set to 1, it indicates that the first information exists in the DCI; and when this bit is set to 0, it indicates that the first information does not exist in the DCI.

It should be noted that in the foregoing embodiment, the terminal determining or obtaining corresponding information by means of RRC configuration means: sending information by means of RRC signaling to determine or obtain corresponding information.

Correspondingly, an embodiment of the present application also provides an information transmission method, which is applied to a network device, and the method includes:
the network device sending first information to the terminal through DCI;
where the first information is used for the terminal to determine time of a channel that can be occupied from a first moment; a format of the DCI is DCI2_0; the first moment is relevant to a moment when the terminal receives the first information.

In practical applications, the network device may configure the number of bits of bit information corresponding to the first information for the terminal.

Based on this, in an embodiment, the method may further include:
when performing RRC configuration on the terminal, configuring the number of bits of bit information corresponding to the first information.

In an embodiment, the bit information includes channel occupancy time information associated with M cells; M is greater than or equal to 1;
and/or,
the bit information includes channel occupancy time information of N subbands; N is greater than or equal to 1.

In practical applications, when the channel occupancy time information associated with a plurality of cells is included, the terminal needs to learn the channel occupancy time information associated with the cell that the terminal accesses according to the bit information, and at this time, the network device may indicate a start bit of the channel occupancy time information associated with each cell in the bit information.

Based on this, in an embodiment, the method may further include:
when performing RRC configuration on the terminal, configuring second information; where the second information is used for the terminal to determine a bit location of the channel occupancy time information associated with each of the M cells in the bit information.

More specifically, the second information indicates the start bit of the channel occupancy time associated with each cell in the bit information.

In practical applications, the value of N, that is, the number of subbands, may be configured by the network device.

Based on this, in an embodiment, the method may further include:
when performing RRC configuration on the terminal, configuring the value of N.

When the bit information contains channel occupancy time information of a plurality of subbands, the terminal also needs to know the channel occupancy time information of each subband. At this time, the network device may configure corresponding information for the terminal so that the terminal may obtain the channel occupancy time information of each subband.

Based on this, in an embodiment, the method may further include:
when performing RRC configuration on the terminal, configuring the number of bits of the channel occupancy time information for each subband; or,
when performing RRC configuration on the terminal, configuring a total number of bits of the channel occupancy information of N subbands; where the numbers of bits of the channel occupancy time information of respective subbands are the same; or,
when performing RRC configuration on the terminal, configuring the number of bits of the channel occupancy time information of the first subband in the N subbands; where the numbers of bits of the channel occupancy time information of respective subbands are the same.

In practical applications, when the channel occupancy time information on a plurality of subbands is included, the terminal needs to know the channel occupancy time information on the subband where it is located based on the bit information, and at this time, it may indicate the start bit of the channel occupancy time information on each subband in the bit information.

Based on this, in an embodiment, the method may further include:
when performing RRC configuration on the terminal, configuring fourth information; where the fourth information is used for the terminal to determine the bit location of the channel occupancy time information of each subband in the N subbands in the bit information.

Specifically, the fourth information indicates the start bit of the subband occupancy information of each subband in the bit information.

In practical applications, some subbands cannot be used in the N subbands, that is, the subbands are invalid. Therefore, the terminal needs to know which subbands are invalid.

Based on this, in an embodiment, the method may further include:
the network device sending fifth information through the DCI; where the fifth information indicates whether each subband of the N subbands is valid.

In practical applications, the DCI may also carry other information. In this case, the terminal also needs to know the location of the first information in the DCI.

Based on this, in an embodiment, the method may further include:
when performing RRC configuration on the terminal, configuring the number of bits of bit information corresponding to the first information.

In practical applications, in order to facilitate the terminal to learn whether the first information is carried in the DCI, indication information may be set.

Based on this, in an embodiment, the method may further include:
when performing RRC configuration on the terminal, configuring third information, where the third information indicates whether the first information exists in the DCI.

Figure 2:
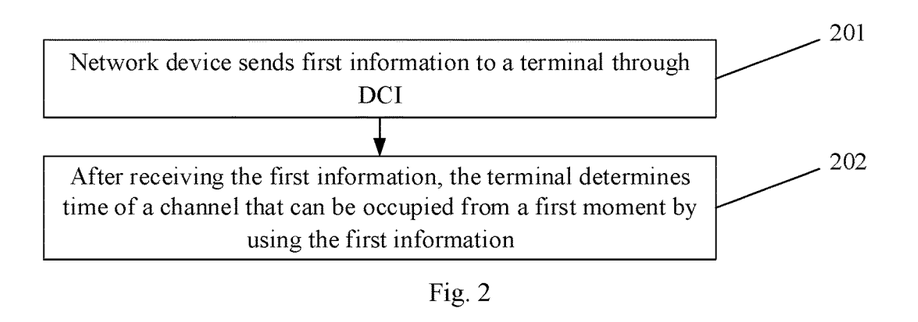
FIG. 2 is a schematic flow diagram of the information transmission method according to the embodiment of the present application.

The embodiment of the present application provides an information transmission method. As shown in FIG. 2, the method includes:

In step 201, the network device sends the first information to the terminal through DCI.

Here, the format of the DCI is DCI2_0.

In step 202, after receiving the first information, the terminal uses the first information to determine the time of the channel that can be occupied from the first moment.

Here, the first moment includes the moment related to the terminal receiving the DCI; or, includes the start time of the $Q^{th}$ FFP after the FFP where the DCI is located; Q is greater than or equal to 1.

It should be noted that the specific processing procedures of the terminal and the network device have been described in detail above, and will not be repeated here.

In the solutions provided by the embodiments of the present application, the network device sends first information to the terminal through DCI; the terminal receives the first information sent by the network device through DCI; and uses the first information to determine the time of the channel that can be occupied from the first moment, and through the bit information in the DCI2_0 format, the channel time that can be occupied is indicated to the terminal. In this way, the indication of the channel occupancy time (COT) information is realized.

The present application will be further described in detail below in conjunction with application embodiments.

In the description of the following application embodiments, for the convenience of description, the time that the channel can be occupied is referred to as COT for short.

First Application Embodiment

In this application embodiment, the base station uses L bits to indicate COT information in the DCI2_0 format, where L includes a first part and a second part, the first part has L-A bits, and the second part has A bits.

When the symbol is an OFDM symbol, A=ceil(log 2(14))= 4, which is used to indicate 1-14 OFDM symbols; and correspondingly, L-4 bits indicate the number of slots.

The value of L is related to the value of MCOT. For example, for the case where the subcarrier spacing (SCS) is 15 khz, assuming MCOT=8 ms, in this case, a maximum of 7 slots are required for indication, then L-4=ceil(log 2(7)), and it may be obtained that L=7.

When the base station uses 7 bits in the DCI2_0 format to indicate COT information, for the UE, after obtaining the 7 bits of COT indication information, the UE first reads the first 3 bits of the most significant bit, and calculates how many slots (3 bits may indicate 0-7 slots) starting from the slot in which DCI2_0 is received plus the number of symbols (4 bits may indicate 1-14 symbols) obtains the end location of the COT information.

Figure 3:
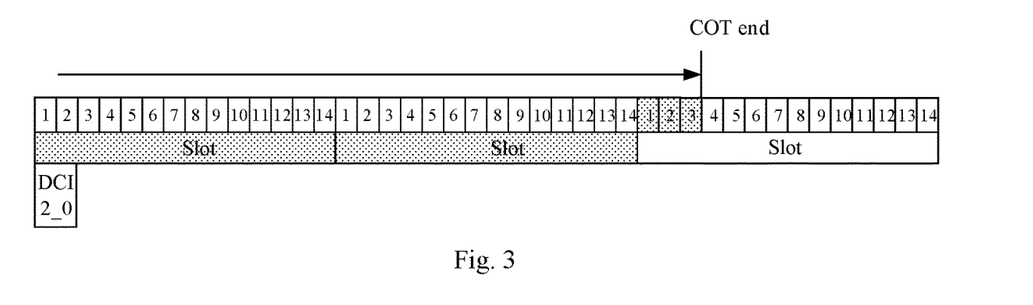
FIG. 3 is a schematic diagram of a channel occupancy information receiving location indicated by L-bit of the subband in the embodiment of the present application.

Assuming L=001 0010, it means that one slot after the slot in which DCI2_0 is received, plus 3 symbols is the end location of the COT information, as shown in FIG. 3.

Figure 4:
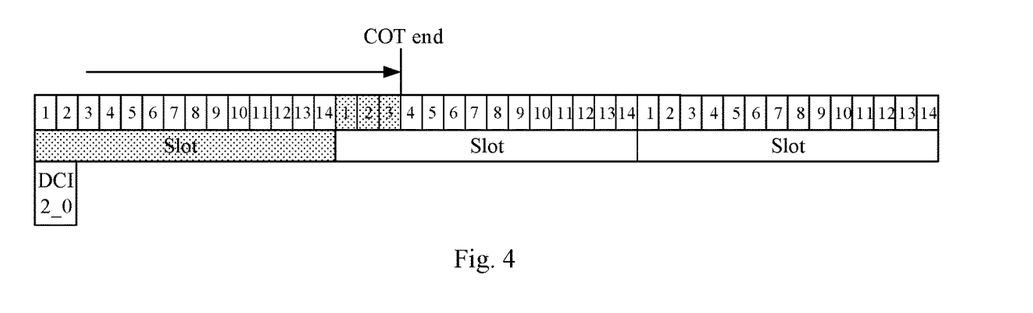
FIG. 4 is another schematic diagram of a channel occupancy information receiving location indicated by L-bit of the subband in the embodiment of the present application.

For another example, L=000 0010, it means that the current slot in which DCI2_0 is received, plus 3 symbols is the end location of the COT information, as shown in FIG. 4.

Second Application Embodiment

The value of L determines how many bits the UE reads to determine the COT information. If the value of L is too small, the length of the COT information is not enough, and if the value of L is too large, bits are wasted. The value of L is related to MCOT, and the value of MCOT is related to the type of network device.

In this application embodiment, the base station uses L bits in the DCI2_0 format to indicate COT information, where L includes the first part and the second part, the first part has L-A bits, and the second part has A bits.

When the symbol is an OFDM symbol, A=ceil(log 2(14))= 4, which is used to indicate 1-14 OFDM symbols; correspondingly, L-4 bits indicate the number of slots.

In FBE system, the length of FFP may be 1-10 ms, and the relationship between T (length of slot) and SCS is shown in Table 1.

TABLE 1

| T | SCS |
|---|---|
| 1 ms | 15 khz |
| 0.5 ms | 30 khz |
| 0.25 ms | 60 khz |

At this time, the number of bits of L may be calculated by the following formula:

$$L=\text{ceil}(\log 2(\text{ceil}(FFP/T)))+4 \qquad (1)$$

Third Application Embodiment

In this application embodiment, the base station uses L bits in the DCI2_0 format to indicate COT information, where L includes the first part and the second part, the first part has L-A bits, and the second part has A bits.

When the symbol is an OFDM symbol, A=ceil(log 2(14))= 4, which is used to indicate 1-14 OFDM symbols; correspondingly, L-4 bits indicate the number of slots.

The value of L may be given by the base station during RRC configuration. Specifically, the base station may fix 4 bits to indicate the number of symbols, and change the value of L during configuration. It is assumed that the lowest 4 bits of the L bits are fixed, and are used to indicate the number of symbols, and the highest L-4 bits change according to the configuration. At this time, the minimum value of L is 4.

For example, the base station configures L=5 in configuration 1, then the highest 1 bit indicates the number of slots, the bit may be 0 or 1, and the lowest 4 bits indicate the number of symbols (i.e., 1-14). If L=6 is configured in configuration 2, then the highest 2 bits indicate the number of slots, the number of slots may be 0-3, and the lowest 4 bits indicate the number of symbols (i.e., 1-14).

In the same way, the base station may also achieve this by fixing the number of slots and changing the number of symbols, that is, fixing the number of bits in the slot and changing the number of bits of the symbol.

Fourth Application Embodiment

The base station may indicate the COT information on a plurality of LBT subbands at the same time, and the COT information on each LBT subband may be indicated by the same number of bits, that is, the number of bits corresponding to the COT information on each of the subbands is the same, which may be expressed as L bits.

Figure 5:
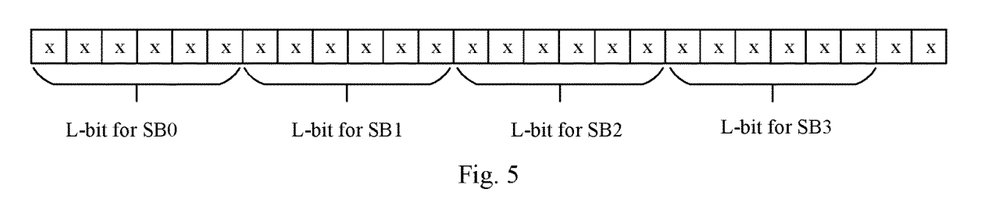
FIG. 5 is a bit location diagram of COT information of a plurality of subbands in the bit information corresponding to the first information in the embodiment of the present application.

For example, the base station is configured with N=4 LBT subbands, the base station may indicate the COT information on 4 subbands through L*4 bits, and the mapping relationship may be that the highest (or lowest) L bits represent the subband 0, the second highest (or second lowest) L bits represent subband 1, and so on, as shown in FIG. 5.

Figure 6:
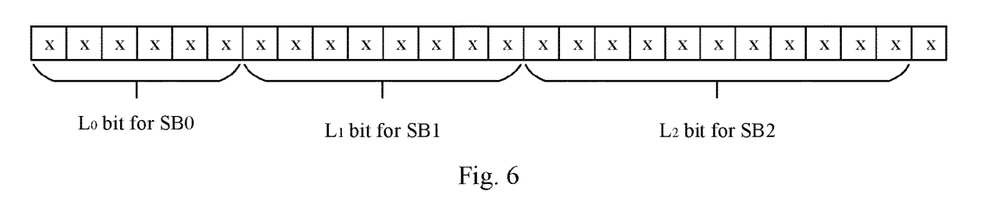
FIG. 6 is another bit location diagram of COT information of a plurality of subbands in the bit information corresponding to the first information in the embodiment of the present application.

It may also be indicated by a different number of bits, that is, the number of bits corresponding to the COT information on each subband is different, which may be expressed as $L_i$, and i represents the subband index. At this time, the base station may indicate the COT information on each subband by using $\Sigma_{i=0}^{N-1}L_i$ bits. Among them, the mapping relationship may be that the highest (or lowest) $L_0$ bits represent subband 0, the second highest (or second lowest) $L_1$ bits represent subband 1, and so on, as shown in FIG. 6.

Fifth Application Embodiment

When configuring DCI2_0, the base station needs to explicitly indicate whether there is COT information in this DCI. If there is COT information, it also needs to indicate at which start bit location in the DCI to start reading the COT information associated with the cell with cell index j, that is, to indicate the start bit of the COT information associated with the cell with the cell index j in the bit information of the COT information.

Figure 7:
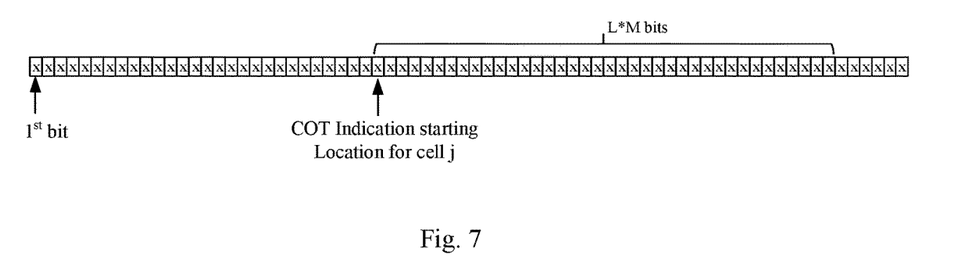
FIG. 7 is a schematic diagram of the bit information structure of a DCI in the embodiment of the present application

After the UE obtains the bit starting location of the COT associated with the cell with cell index j, it may read Q bits continuously from the starting location (if the cell with cell index j has only one LBT subband), or read Q*N bits continuously (if the cell with cell index j has N LBT subbands); among them, the number of bits corresponding to the COT information on each subband is the same, that is, all are Q bits, as shown in FIG. 7.

Sixth Application Embodiment

When configuring DCI2_0, the base station needs to explicitly indicate whether there is COT information in this DCI. If there is COT information, then it is obtained implicitly through other information that the COT information associated with the cell with cell index j is started to be read from which start bit location in the DCI.

Figure 8:
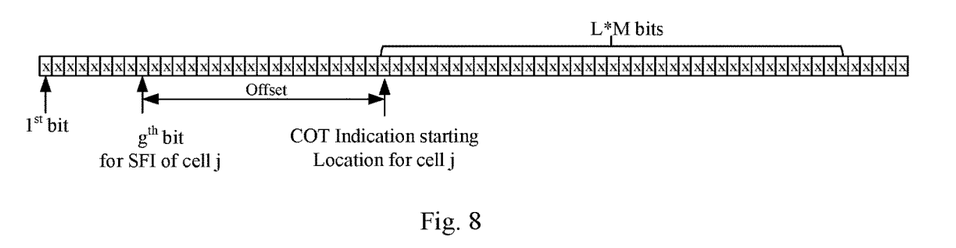
FIG. 8 is another schematic diagram of the bit information structure of the DCI in the embodiment of the present application.

For example, the base station may indicate the start bit location of the SFI of one cell, and the start bit of the COT information is an offset relative to the start bit of the SFI, as shown in FIG. 8. Among them, the offset may be explicitly given by the base station, or may be a fixed value.

Figure 9:
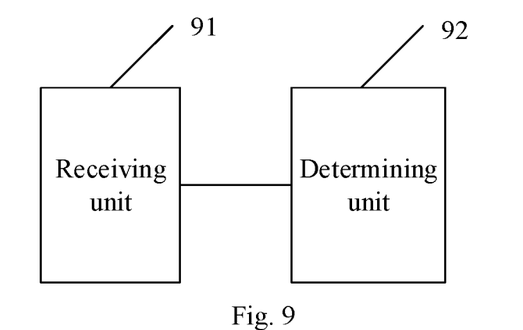
FIG. 9 is a structural diagram of an information transmission apparatus according to an embodiment of the present application.

In order to implement the method on the terminal side of the embodiments of the present application, the embodiments of the present application also provide an information transmission apparatus, which is arranged on the terminal. As shown in FIG. 9, the apparatus includes:

a receiving unit 91, configured to receive first information sent by a network device through DCI; and a determining unit 92, configured to determine time of a channel that can be occupied from a first moment using the first information.

In an embodiment, the bit information includes channel occupancy time information associated with M cells; M is greater than or equal to 1; and/or, the bit information includes channel occupancy time information of N subbands; N is greater than or equal to 1.

In an embodiment, the determining unit 92 is further configured to obtain a value of N through a radio resource control (RRC) configuration.

In an embodiment, the determining unit 92 is further configured to:

obtain the number of bits of channel occupancy time information for each subband by means of RRC configuration; or, obtain the total number of bits of channel occupancy information for N subbands through RRC configuration; determine the number of bits of channel occupancy time information for each subband based on the total number of bits obtained; where the number of bits of channel occupancy time information for each subband is the same; or, obtain the number of bits of the channel occupancy time information of the first subband in the N subbands by means of RRC configuration; and based on the obtained number of bits of the channel occupancy time information of the subband, determine the number of bits of the channel occupancy time information of other subband(s) in the N subbands except the first subband; where the number of bits of the channel occupancy time information of each subband is the same; or, the number of bits of channel occupancy time information for each subband is fixed.

In an embodiment, the determining unit 92 is further configured to:

obtain second information by means of RRC configuration.

The terminal uses the second information to determine the bit location of the channel occupancy time information associated with each cell in M in the bit information.

The determining unit is configured to use the second information to determine the start bit of the channel occupancy time associated with each cell in the bit information.

In an embodiment, the receiving unit 91 is further configured to receive fifth information sent by the network device through the DCI.

The determining unit 92 is further configured to use the fifth information to determine whether each subband of the N subbands is valid.

In an embodiment, the determining unit 92 is further configured to determine the number of bits of bit information corresponding to the first information by means of RRC configuration; or, the number of bits of bit information corresponding to the first information is fixed.

In an embodiment, the determining unit 92 is further configured to:

obtain the third information by means of RRC configuration;

determine whether the first information exists in the DCI using the third information.

In an embodiment, the determining unit 92 is further configured to:

obtain the start bit of the first information in the DCI by means of RRC configuration.

In practical applications, the receiving unit 91 may be implemented by a communication interface in the information transmission apparatus; and the determining unit 92 may be implemented by a processor in combination with the communication interface in the information transmission apparatus.

Figure 10:
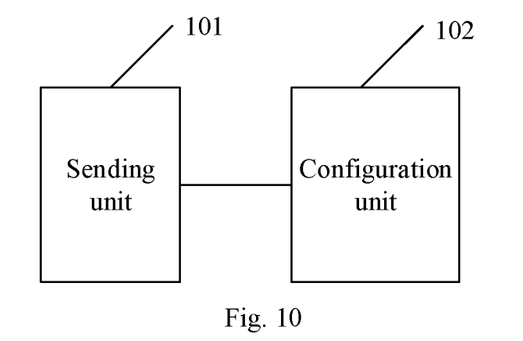
FIG. 10 is another structural diagram of the information transmission apparatus according to the embodiment of the present application.

In order to implement the method on the network device side of the embodiment of the present application, the embodiment of the present application also provides an information transmission apparatus, which is arranged on the network device. As shown in FIG. 10, the apparatus includes:

a sending unit 101, configured to send first information to the terminal through DCI; where the first information is used for the terminal to determine the time of the channel that can be occupied from the first moment.

In an embodiment, the bit information includes channel occupancy time information associated with M cells; M is greater than or equal to 1; and/or, the bit information includes channel occupancy time information of N subbands; N is greater than or equal to 1.

Here, in an embodiment, as shown in FIG. 10, the apparatus further includes:

a configuration unit 102, configured to configure the value of N when performing radio resource control (RRC) configuration on the terminal.

In an embodiment, the configuration unit 102 is configured to:

when performing RRC configuration on the terminal, configure the number of bits of channel occupancy time information for each subband; or, when performing RRC configuration on the terminal, configure the total number of bits of channel occupancy information of N subbands; where the number of bits of channel occupancy time information of each subband is the same; or, when performing RRC configuration on the terminal, configure the number of bits of the channel occupancy time information of the first subband among the N subbands; where the number of bits of the channel occupancy time information of each subband is the same.

In an embodiment, the configuration unit 102 is configured to:

when performing RRC configuration on the terminal, configure second information; where the second information is used for the terminal to determine the bit location of the channel occupancy time information associated with each cell in M in the bit information.

In an embodiment, the sending unit 101 is configured to send fifth information to the DCI; and the fifth information indicates whether each subband of the N subbands is valid.

In an embodiment, the configuration unit 102 is configured to configure the number of bits of bit information corresponding to the first information when performing RRC configuration on the terminal.

In an embodiment, the configuration unit 102 is configured to configure third information when performing RRC configuration on the terminal, and the third information indicates whether the first information exists in the DCI.

In an embodiment, the configuration unit 102 is configured to configure the start bit of the first information in the DCI when performing RRC configuration on the terminal.

It should be noted that the sending unit 101 may be implemented by a communication interface in the information transmission apparatus; and the configuration unit 102 may be implemented by a processor in combination with the communication interface in the information transmission apparatus.

It should be noted that when the information transmission apparatus provided in the above embodiments performs flow control, the division of the above program modules is only used as an example for illustration. In practical applications, the above processing may be allocated to different program modules according to needs. That is, the internal structure of the apparatus is divided into different program modules to complete all or part of the processing described above.

In addition, the information transmission apparatus and information transmission method embodiments provided in the foregoing embodiments belong to the same concept, and the specific implementation process is detailed in the method embodiments, and will not be repeated here.

Figure 11:
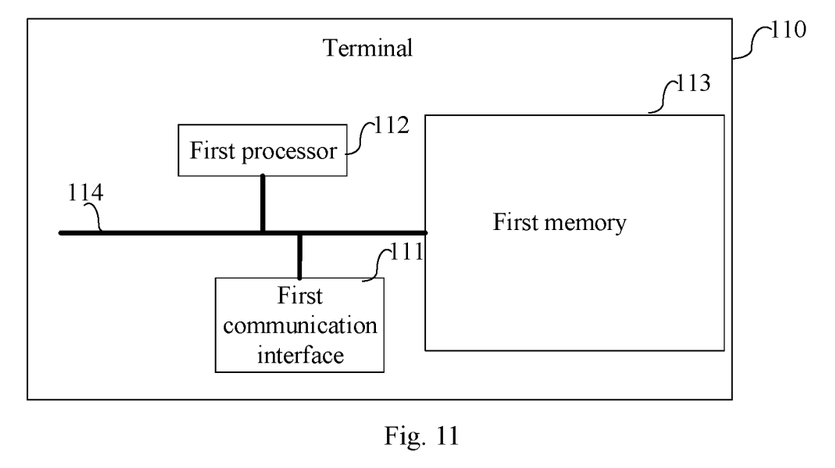
FIG. 11 is a schematic diagram of a terminal structure according to an embodiment of the present application.

Based on the hardware implementation of the above program modules, and for the terminal side method of the embodiments of the present application, the embodiment of the present application also provides a terminal. As shown in FIG. 11, the terminal 110 includes:

a first communication interface 111 capable of exchanging information with other device(s) such as a network device; and a first processor 112, connected to the first communication interface 111 to implement information interaction with other protocol entity (entities), and being used to execute the method provided by one or more technical solutions on the terminal side when running a computer program. The computer program is stored in a first memory 113.

In practical applications, the various components in the terminal 110 are coupled together through a bus system 114. It may be understood that the bus system 114 is used to implement connection and communication between these components. In addition to the data bus, the bus system 114 also includes a power bus, a control bus, and a status signal bus. However, for the sake of clear description, various buses are marked as the bus system 114 in FIG. 11.

The first memory 113 in the embodiment of the present application is used to store various types of data to support the operation of the terminal 110. Examples of these data include: any computer program used to operate on the terminal 110.

The method disclosed in the foregoing embodiments of the present application may be applied to the first processor 112 or implemented by the first processor 112. The first processor 112 may be an integrated circuit chip with signal processing capability. In the implementation process, the steps of the foregoing method may be completed by an integrated logic circuit of hardware in the first processor 112 or instructions in the form of software. The aforementioned first processor 112 may be a general-purpose processor, a digital signal processor (DSP), or other programmable logic device, discrete gate or transistor logic device, discrete hardware component, and the like. The first processor 112 may implement or execute the methods, steps, and logical block diagrams disclosed in the embodiments of the present application. The general-purpose processor may be a microprocessor or any conventional processor or the like. The steps of the method disclosed in the embodiments of the present application may be directly embodied as being executed and completed by a hardware decoding processor, or executed and completed by a combination of hardware and software modules in the decoding processor. The software module may be located in a storage medium, and the storage medium is located in the first memory 113. The first processor 112 reads the information in the first memory 113 and completes the steps of the foregoing method in combination with its hardware.

When the first processor 112 executes the computer program, the corresponding process implemented by the terminal in each method in the embodiments of the present application is implemented. For brevity, details are not described herein again.

Figure 12:
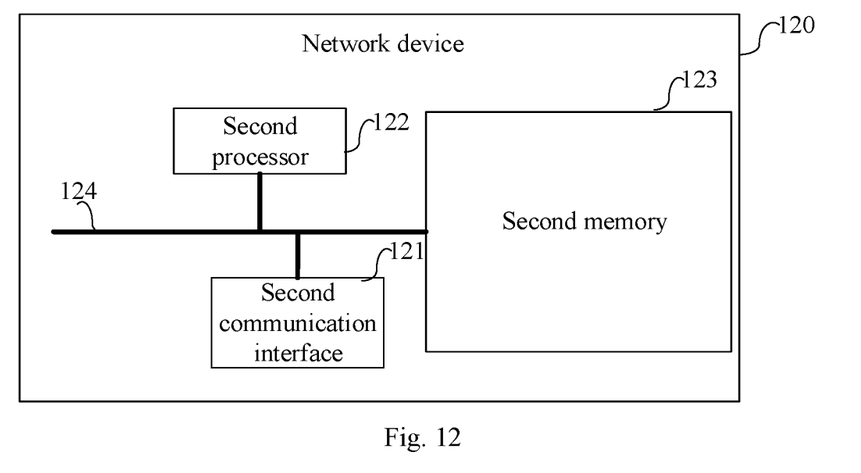
FIG. 12 is a structural diagram of a network device according to an embodiment of the present application.

Based on the hardware implementation of the above program modules, and in order to implement the method on the network device side of the embodiments of the present application, the embodiment of the present application also provides a network device. As shown in FIG. 12, the network device 120 includes:

a second communication interface 121 capable of exchanging information with other device(s), such as a terminal; and a second processor 122, connected to the second communication interface 121 to implement information interaction with the terminal, and being used to execute the method provided by one or more technical solutions on the network device side when running a computer program. The computer program is stored in a second memory 123.

In practical applications, the various components in the network device 120 are coupled together through the bus system 124. It may be understood that the bus system 124 is used to implement connection and communication between these components. In addition to the data bus, the bus system 124 also includes a power bus, a control bus, and a status signal bus. However, for clarity of description, various buses are marked as the bus system 124 in FIG. 12.

The second memory 123 in the embodiments of the present application is used to store various types of data to support the operation of the network device 120. Examples of such data include: any computer program used to operate on the network device 120.

The method disclosed in the foregoing embodiment of the present application may be applied to the second processor 122 or implemented by the second processor 122. The second processor 122 may be an integrated circuit chip with signal processing capability. In the implementation process, the steps of the foregoing method may be completed by an integrated logic circuit of hardware in the second processor 122 or instructions in the form of software. The aforementioned second processor 122 may be a general-purpose processor, a DSP, or other programmable logic device, discrete gate or transistor logic device, discrete hardware component, or the like. The second processor 122 may implement or execute the methods, steps, and logical block diagrams disclosed in the embodiments of the present application. The general-purpose processor may be a microprocessor or any conventional processor or the like. The steps of the method disclosed in the embodiments of the present application may be directly embodied as being executed and completed by a hardware decoding processor, or executed and completed by a combination of hardware and software modules in the decoding processor. The software module may be located in a storage medium, and the storage medium is located in the second memory 123. The second processor 122 reads the information in the second memory 123 and completes the steps of the foregoing method in combination with its hardware.

When the second processor 122 executes the computer program, the corresponding process implemented by the network device in each method in the embodiments of the present application is implemented. For the sake of brevity, details are not described herein again.

It may be understood that the memory (the first memory 113 and the second memory 123) of the embodiments of the present application may be a volatile memory or a non-volatile memory, and may also include both volatile and non-volatile memories. Among them, the non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a Flash Memory, a magnetic surface memory, a CD, or a Compact Disc Read-Only Memory (CD-ROM); and the magnetic surface memory may be a disk storage or a tape storage. The volatile memory may be a Random Access Memory (RAM), which is used as an external cache. By way of exemplary but not restrictive description, many forms of RAM are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memories described in the embodiments of the present application are intended to include, but are not limited to, these and any other suitable types of memories.

Figure 13:
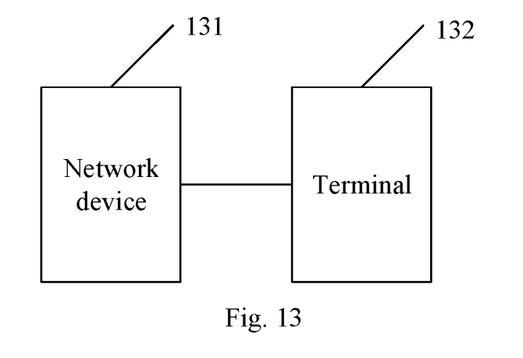
FIG. 13 is a structural diagram of an information transmission system according to an embodiment of the present application.

The embodiments of the present application also provide an information transmission system. As shown in FIG. 13, the system includes: a network device 131 and a terminal 132.

The network device 131 is configured to send first information to the terminal 132 through DCI; where the format of the DCI is DCI2_0.

The terminal 132 is configured to receive the first information sent by the network device through the DCI; and determine the time of the channel that can be occupied from the first moment using the first information.

Here, it should be noted that the specific processing procedures of the network device 131 and the terminal 132 have been described in detail above, and will not be repeated here.

In an exemplary embodiment, the embodiment of the present application also provides a storage medium, that is, a computer storage medium, specifically a computer-readable storage medium.

For example, the storage medium includes the first memory 113 storing a computer program, and the above-mentioned computer program may be executed by the first processor 112 of the terminal 110 to complete the steps described in the aforementioned terminal-side method. For another example, the storage medium includes the second memory 123 storing a computer program, which may be executed by the second processor 122 of the network device 120 to complete the steps described in the aforementioned network device-side method. The computer-readable storage medium may be a memory such as FRAM, ROM, PROM, EPROM, EEPROM, Flash Memory, magnetic surface memory, optical disk, or CD-ROM.

In several embodiments provided by the present application, it should be understood that the apparatus, terminal and method disclosed may be implemented in other manner. The device embodiments described above are merely schematic.

For example, the division of the units is only a type of logical function division, and there may be other division manner in actual implementation, for example, a plurality of units or components may be combined or integrated into another system, or some features may be ignored or not performed. On the other hand, a mutual coupling, a direct coupling or a communication connection between the displayed or discussed components may be an indirect coupling or a communication connection through some interfaces, devices or units, and may be electrical, mechanical or in other form.

The unit illustrated as a separate component may be or may not be physically separate, and a component displayed as a unit may be or may not be a physical unit, i.e. it may be located in one place or may also be distributed onto a plurality of network units. Some or all of the units may be selected according to the actual needs to achieve the objective of the solution of the present embodiments.

In addition, the functional units in the embodiments of the present application may all be integrated into one processing unit, or each unit may be individually used as a unit, or two or more units may be integrated into one unit; the abovementioned integrated unit may be implemented in the form of hardware, or in the form of hardware plus software functional units.

A person of ordinary skill in the art can understand that all or part of the steps in the above method embodiments may be implemented by hardware associated with program instructions. The foregoing program may be stored in a computer readable storage medium. When the program is executed, the steps including the foregoing method embodiments are executed; and the foregoing storage medium includes: various media that can store program codes, such as a mobile storage device, ROM, RAM, a magnetic disk, or an optical disk.

Alternatively, if the aforementioned integrated unit of the present application is implemented in the form of a software function module and sold or used as an independent product, it may also be stored in a computer readable storage medium. Based on such understanding, the essence of the technical solution of the present application or the part contributing to the related art may be embodied in the form of a software product, and the computer software product is stored in a storage medium including several instructions such that a computer device (which may be a personal computer, a server, or a network device, etc.) executes all or part of the steps of the method described in each embodiment of the present application. The aforementioned storage medium includes a removable storage device, ROM, RAM, a magnetic disk, or an optical disk and other media that can store program codes.

The foregoing descriptions are merely specific implementation manners of the embodiments of the present application, and the protection scope of the present application is not limited thereto. Any person skilled in the art can easily think of changes or substitutions within the technical scope disclosed in the present application, and such changes or substitutions should be covered in the protection scope of the present application. Therefore, the protection scope of the present application should be subject to the protection scope of the claims.

What is claimed is:

1. An information transmission method, comprising:
receiving, by a terminal, first information sent by a network device through downlink control information (DCI); and
determining, by the terminal, time of a channel that can be occupied from a first moment by using the first information, wherein the first information corresponds to bit information and the bit information is in the DCI, and
wherein the bit information corresponding to the first information comprises M portions, wherein each of the M portions corresponds to channel occupancy time information associated with one cell of M cells, M is greater than 1,
wherein the method further comprises:
obtaining, by the terminal, second information by means of RRC configuration; and
determining, by the terminal, a bit location of the channel occupancy time information associated with each cell in the M cells in the bit information by using the second information,
wherein the terminal determines a start bit of the channel occupancy time information associated with each cell in the bit information by using the second information.

2. The method according to claim 1, wherein a format of the DCI is DCI2_0.

3. The method according to claim 1, wherein
the first moment comprises a moment related to the terminal receiving the DCI; or,
the first moment comprises a start moment of a $Q^{th}$ fixed frame period (FFP) after an FFP where the DCI is located, Q is greater than or equal to 1.

4. The method according to claim 1, wherein the bit information further comprises channel occupancy time information of N subbands, N is greater than or equal to 1, and the N subbands correspond to one cell.

5. The method according to claim 4, wherein the method further comprises:
receiving fifth information sent by the network device through the DCI; and
determining whether each subband of the N subbands is valid by using the fifth information.

6. An information transmission method, comprising:
sending, by a network device, first information to a terminal through downlink control information (DCI); wherein the first information is used for the terminal to determine time of a channel that can be occupied from a first moment, wherein the first information corresponds to bit information and the bit information is in the DCI, and
wherein the bit information corresponding to the first information comprises M portions, wherein each of the M portions corresponds to channel occupancy time information associated with one cell of M cells, M is greater than 1,
wherein the method further comprises:
when performing RRC configuration on the terminal, configuring second information, wherein the second information is used for the terminal to determine a bit location of the channel occupancy time information associated with each cell in the M cells in the bit information,
wherein the second information indicates a start bit of the channel occupancy time information associated with each cell in the bit information.

7. The method according to claim 6, wherein a format of the DCI is DCI2_0; and
wherein
the first moment comprises a moment related to the terminal receiving the DCI; or,
the first moment comprises a start moment of a $Q^{th}$ fixed frame period (FFP) after an FFP where the DCI is located, Q is greater than or equal to 1.

8. The method according to claim 6, wherein
the bit information further comprises channel occupancy time information of N subbands, N is greater than or equal to 1, and the N subbands correspond to one cell.

9. The method according to claim 8, wherein the method further comprises:
sending, by the network device, fifth information through the DCI, wherein the fifth information indicates whether each subband of the N subbands is valid.

10. An information transmission apparatus arranged on a terminal, comprising:
a first processor and a first memory for storing a computer program capable of running on the first processor,
wherein the first processor is configured to:
receive first information sent by a network device through downlink control information (DCI); and
determine time of a channel that can be occupied from first moment by using the first information, wherein the first information corresponds to bit information and the bit information is in the DCI, and wherein the bit information corresponding to the first information comprises M portions, wherein each of the M portions corresponds to channel occupancy time information associated with one cell of M cells, M is greater than 1, wherein the first processor is further configured to:

obtain second information by means of RRC configuration; and determine by the terminal a bit location of the channel occupancy time information associated with each cell in M cells in the bit information by using the second information, and wherein the first processor is further configured to determine a start bit of the channel occupancy time information associated with each cell in the bit information by using the second information.

11. The apparatus according to claim 10, wherein a format of the DCI is DCI2_0.

12. The apparatus according to claim 10, wherein
the first moment comprises a moment related to the terminal receiving the DCI; or,
the first moment comprises a start moment of a $Q^{th}$ fixed frame period (FFP) after an FFP where the DCI is located, Q is greater than or equal to 1.

13. The apparatus according to claim 10, wherein
the bit information further comprises channel occupancy time information of N subbands, N is greater than or equal to 1; and the N subbands correspond to one cell.

14. The apparatus according to claim 13, wherein the first processor is further configured to receive fifth information sent by the network device through the DCI; and
the first processor is further configured to determine whether each subband of the N subbands is valid by using the fifth information.

15. An information transmission apparatus arranged on a network device, including:
a second processor and a second memory for storing a computer program capable of running on the second processor, wherein the second processor is configured to:

send first information to a terminal through downlink control information (DCI); wherein the first information is used for the terminal to determine time of a channel that can be occupied from a first moment, wherein the first information corresponds to bit information and the bit information is in the DCI, and wherein the bit information corresponding to the first information comprises M portions, wherein each of the M portions corresponds to channel occupancy time information associated with one cell of M cells, M is greater than 1, wherein the first processor is further configured to:

when performing RRC configuration on the terminal, configure second information, wherein the second information is used for the terminal to determine a bit location of the channel occupancy time information associated with each cell in the M cells in the bit information, wherein the second information indicates a start bit of the channel occupancy time associated with each cell in the bit information.

16. The apparatus according to claim 15, wherein a format of the DCI is DCI2_0.

17. The apparatus according to claim 15, wherein
the first moment comprises a moment related to the terminal receiving the DCI;
or,
the first moment comprises a start moment of a $Q^{th}$ fixed frame period (FFP) after an FFP where the DCI is located, Q is greater than or equal to 1.

18. The apparatus according to claim 15, wherein
the bit information comprises channel occupancy time information of N subbands, N is greater than or equal to 1, and the N subbands correspond to one cell.

19. The apparatus according to claim 18, wherein the first processor is further configured to send fifth information through the DCI, wherein the fifth information indicates whether each subband of the N subbands is valid.

* * * * *